Figure 1:
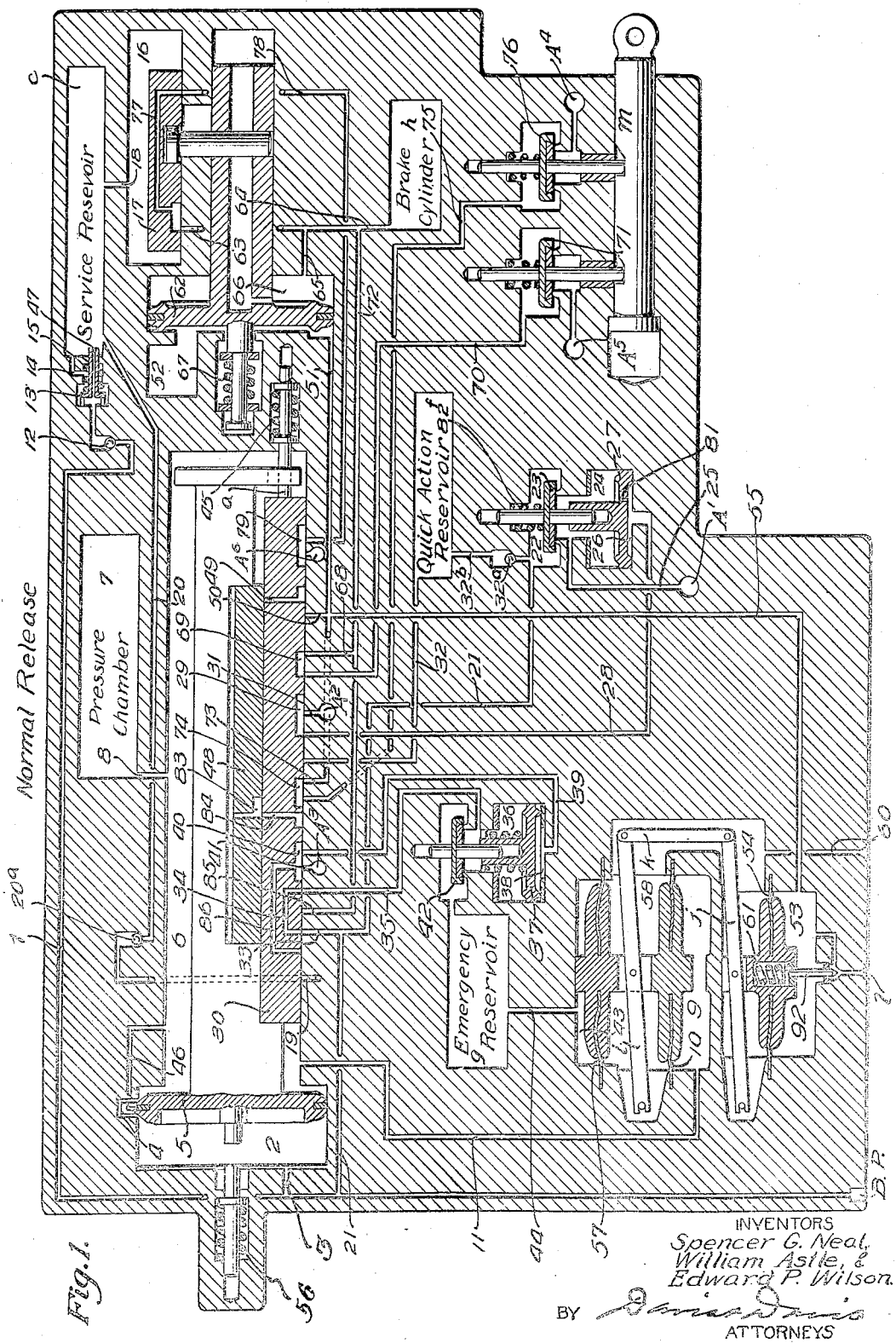

Sept. 28, 1926.
S. G. NEAL ET AL
1,601,580
TRIPLE VALVE FOR AIR BRAKE APPARATUS
Filed Dec. 5, 1924    6 Sheets-Sheet 1

INVENTORS
Spencer G. Neal,
William Astle, &
Edward P. Wilson.
BY
ATTORNEYS

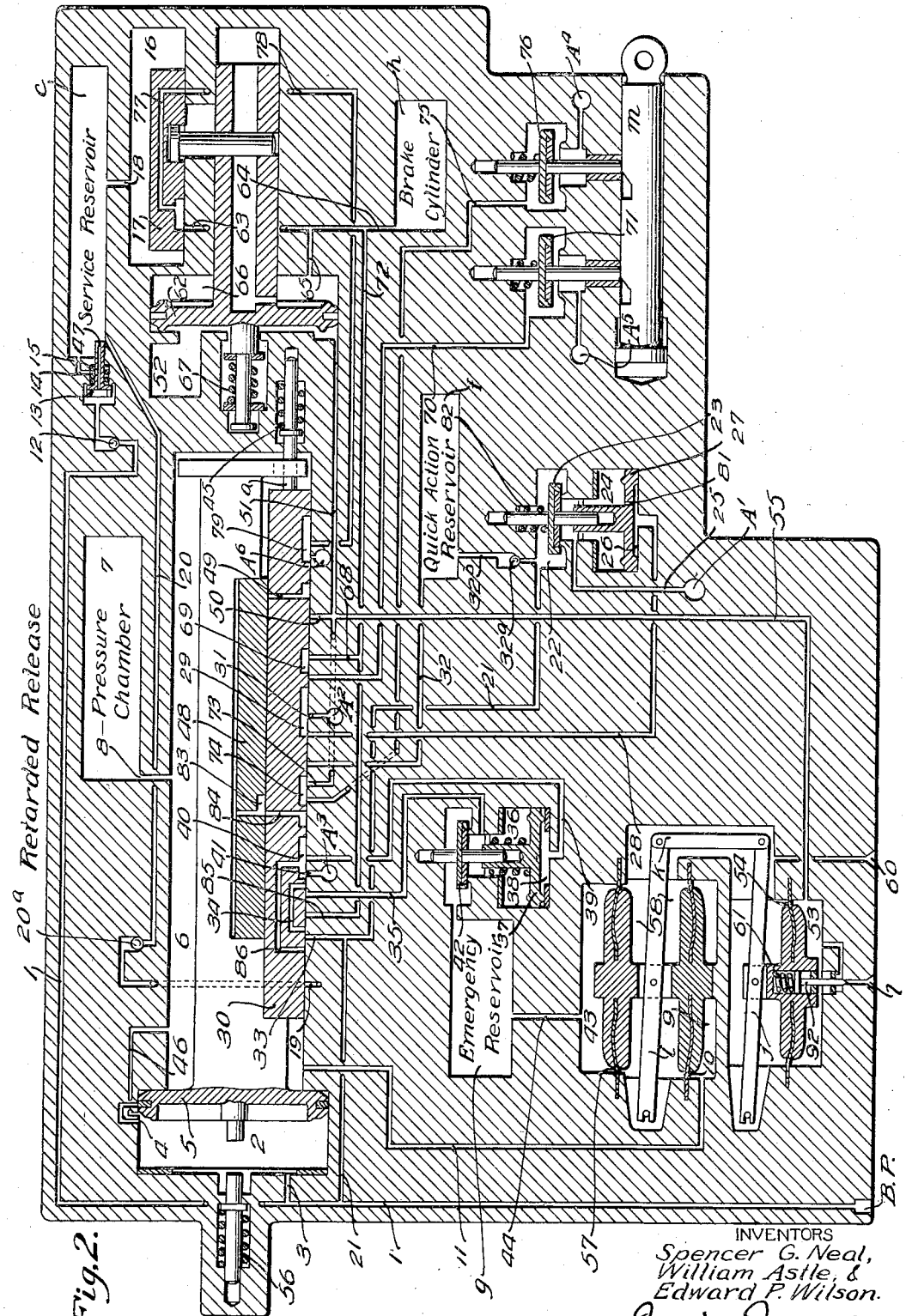

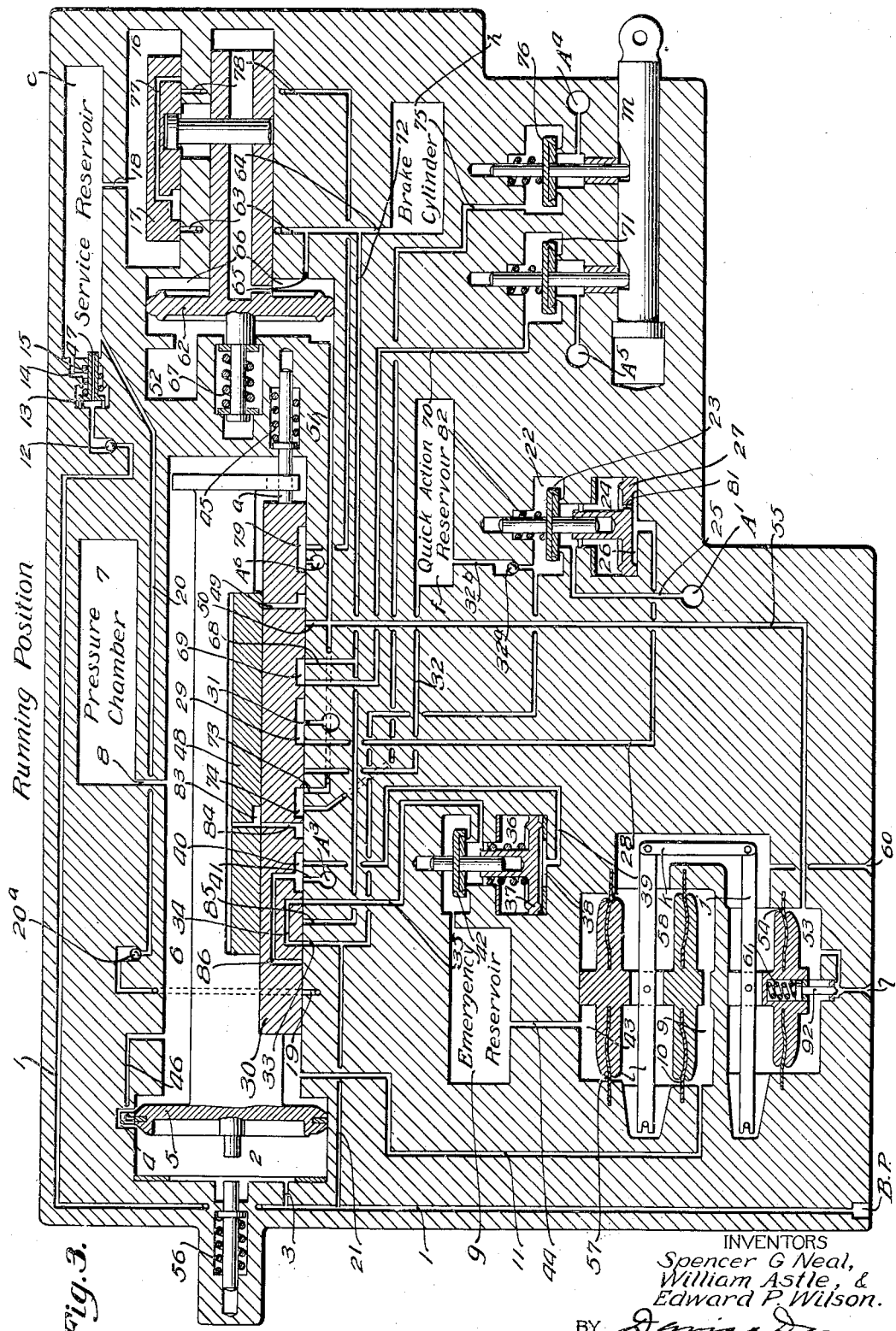

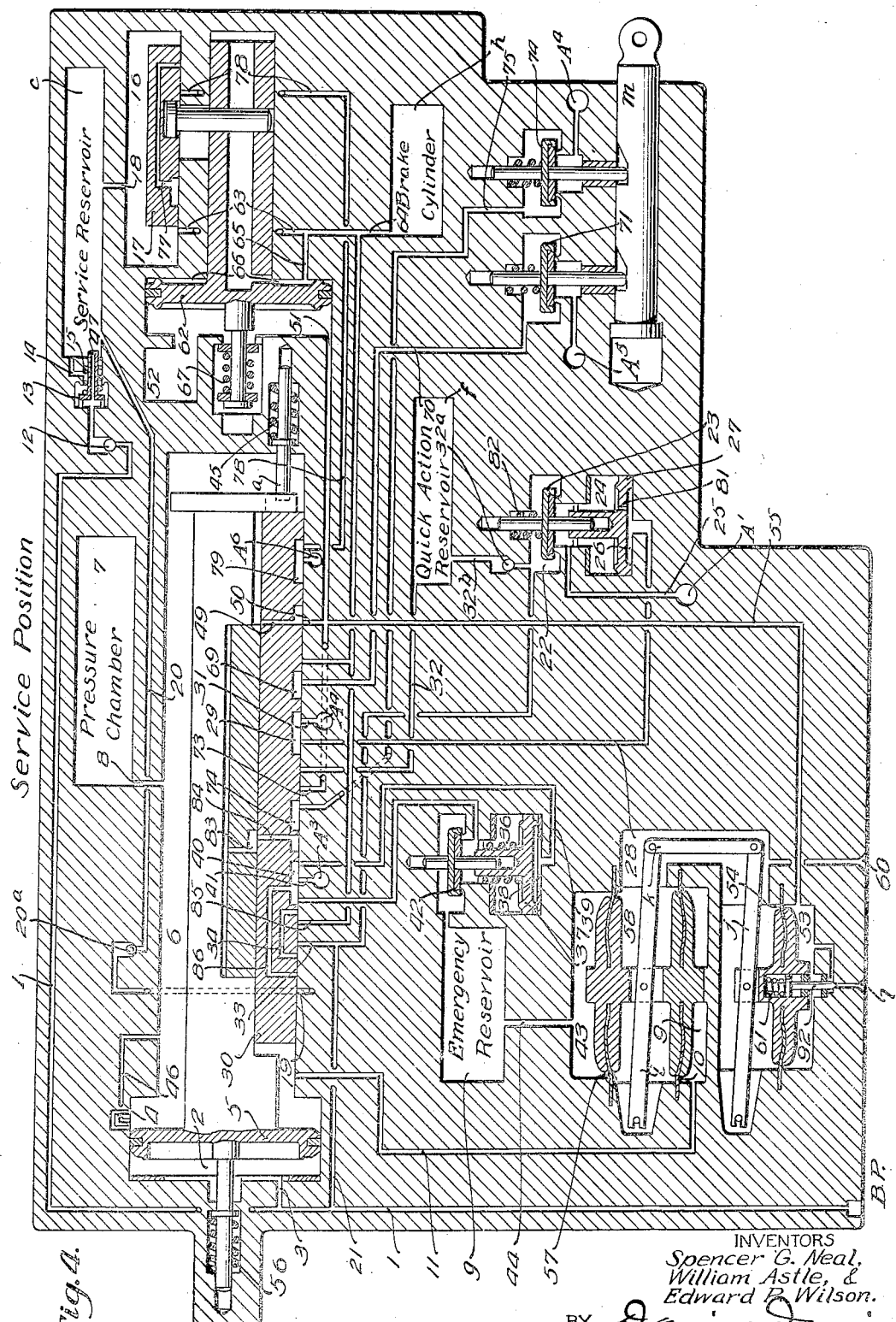

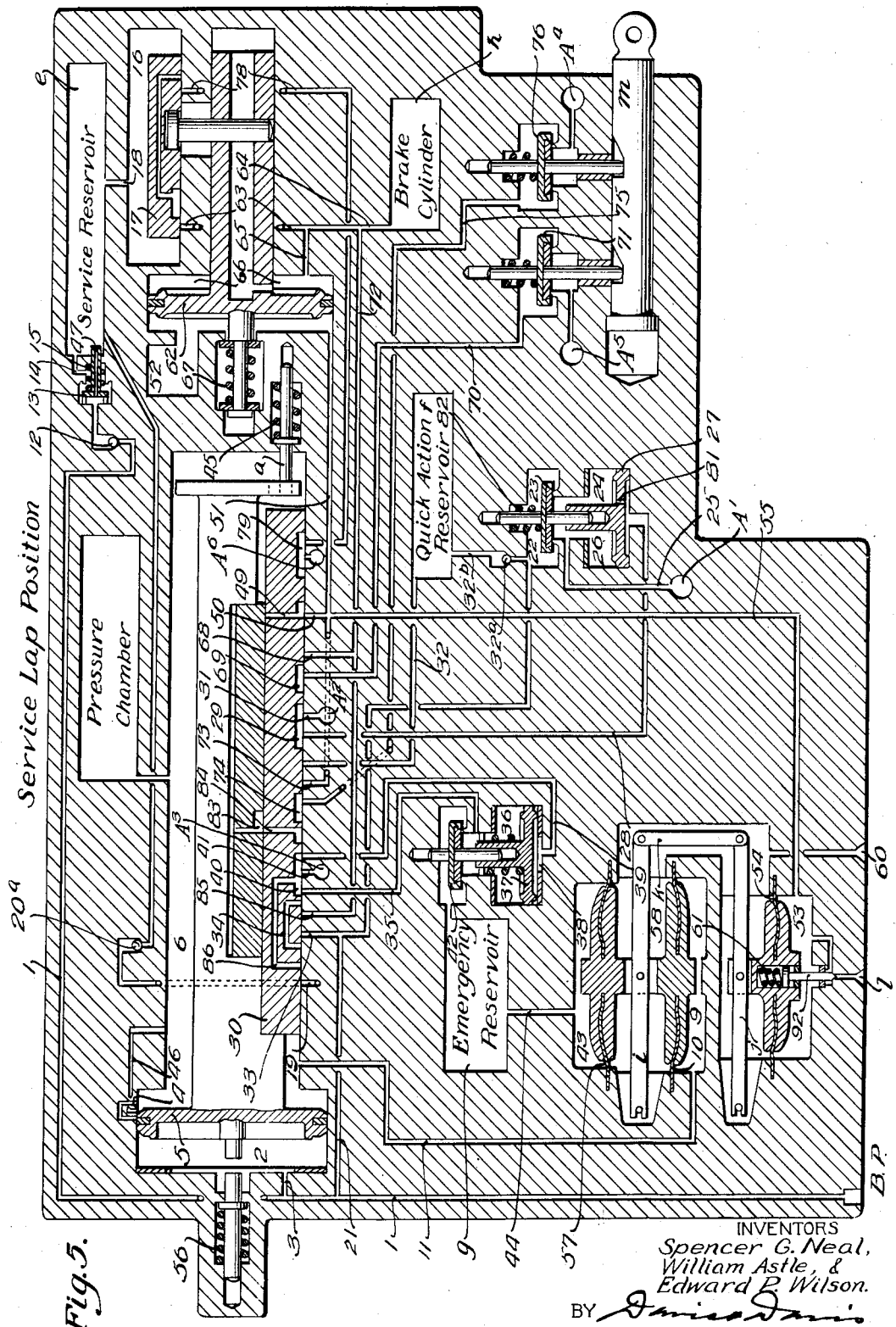

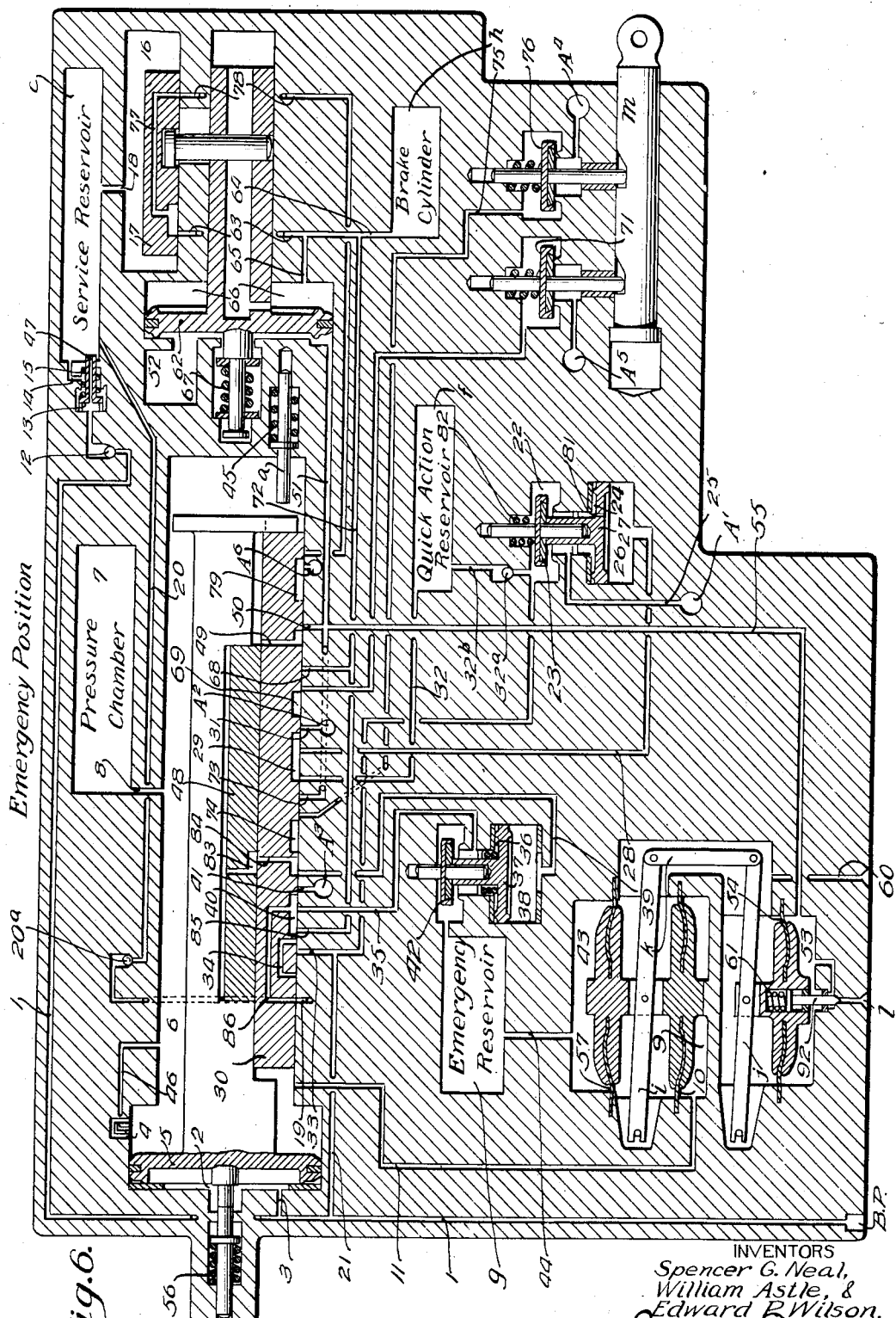

Patented Sept. 28, 1926.

1,601,580

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

TRIPLE VALVE FOR AIR-BRAKE APPARATUS.

Application filed December 5, 1924. Serial No. 754,110.

This invention relates to improvements in that type of triple valves which operate upon a reduction of brake pipe pressure to connect a pressure chamber to a control chamber to thereby build up in the control chamber a pressure equal to the desired brake cylinder pressure, said desired brake cylinder pressure being dependent upon and at a predetermined ratio to the pressure reduction in the brake pipe. The pressure in the control chamber moves an application valve into position to connect a service reservoir to the brake cylinder and to a brake cylinder chamber. When the brake cylinder pressure and the pressure in the brake cylinder chamber has been built up to an equality with the pressure previously established in the control chamber the application valve is moved back to lap position.

One of the main objects of the invention is to provide means subject to the pressures of an emergency reservoir, brake pipe and the control chamber, for governing the pressure in the control chamber. This pressure governing means is designed to be operated by increases in brake pipe pressure and also by an excess pressure in the control chamber. The emergency reservoir serves as a constant pressure reservoir for the pressure governing means in graduated release operations.

Another object of the invention is to provide a pressure governing means which will respond to increases in brake pipe pressure to exhaust air from the control chamber and thereby maintain the pressure in said chamber at a predetermined relation to the brake pipe pressure so that by increasing the brake pipe pressure a predetermined amount the brake cylinder pressure may be reduced a predetermined amount. By this means the brake cylinder pressure may be reduced in steps to provide a graduated release.

Another object of the invention is to provide manually operable means controlling a direct quick release of brake cylinder pressure and a direct quick release of pressure from the control chamber to thereby secure a quick release of the brakes.

Another object of the invention is to provide a main slide valve and a graduating valve responsive to variations in brake pipe pressure and operating upon a reduction of brake pipe pressure to connect the pressure chamber to the control chamber and to the pressure governing chamber, and operating upon an increase in brake pipe pressure to connect the brake cylinder to atmosphere when the application valve has been moved to release position. When the release governing valve is in quick release position the main slide valve in release position will connect the brake cylinder and the control chamber direct to atmosphere through the release governing valve means. When the release governing valve device is in graduated release position the pressure governing means will control the exhaust from the control chamber and the main slide valve and the application valve will control the exhaust from the brake cylinder.

Another important object of the invention is to provide means whereby during a period of excessive brake pipe pressure the main slide valve will be moved to retarded release and retarded re-charging position. The object of this is to restrict the charging of the reservoirs at the head end of the train, during a period of excessive brake pipe pressure so that a large proportion of the air will flow through the brake pipe toward the rear end of the train. A further object of this feature of the invention is to retard the release of the brakes in the forward end of the train and also to prevent over-charging the emergency reservoirs on the cars at the head end of the train.

There are other important objects and advantages of the invention which will appear hereinafter.

In the drawings, Fig. 1 is a diagrammatic view of the triple valve showing the parts in the normal charging and normal release position;

Fig. 2 a view similar to Fig. 1 showing the parts in retarded release and retarded recharging position;

Fig. 3 a diagrammatic view similar to Figs. 1 and 2 showing the parts in fully charged and running position;

Fig. 4 a diagrammatic view similar to Fig. 1 showing the parts in service application position;

Fig. 5 a view similar to Fig. 4 showing the parts in service lap position; and

Fig. 6 a diagrammatic view similar to Fig. 1 showing the parts in emergency application position.

In order to simplify the description of the triple valve, the various parts and the ports and passages will not be specifically described except in connection with the various operations of the triple valve.

*Charging the system.*

*Normal charging and normal release position (Fig. 1).*—When charging the system air passes from the brake pipe through passages 1 and 3 to the main brake pipe chamber 2 in which is arranged the main operating piston 5. Connected to the chamber 2 is a main slide valve chamber 6. The piston 5 carries a piston stem which extends longitudinally through the valve chamber 6 and is suitably guided therein. Chamber 6 is separated from chamber 2 by the piston 5. The piston stem is operatively connected to a graduating valve 48 and to a main slide valve 30, the main slide valve moving over a seat formed on the lower wall of the valve chamber 6 and the graduating valve operating on top of the main slide valve. There is a lost motion connection between the main slide valve and the piston stem and a direct positive connection between the graduating valve and the piston stem. The increase in pressure in chamber 2 forces the piston 5 inwardly and carries the main slide valve into engagement with a normal charging stop $a$. This stop is held in its normal position by a spring 45 and yieldingly holds the valves and the main piston 5 in normal charging position. When the main operating piston is in normal charging position chamber 2 is in communication with chamber 6 through a by-pass port 4 so that chamber 6 will be charged through said by-pass. The pressure chamber 7 is in direct open communication with chamber 6 through port 8 and will be charged from chamber 6. The valve chamber 6 is in direct open communication with the actuating chamber 9 through passage 11 so that the actuating chamber will be charged from chamber 6. The upper wall of the actuating chamber is formed by an actuating diaphragm 10.

The service reservoir $c$ is charged from passage 1 past the non-return check valve 12, around spring pressed check valve 13 and through passage 14 which opens into the reservoir. The check valve 13 is normally held open, as shown in Fig. 1, by a spring 15. The stem of the check valve is provided with a longitudinally extending restricted charging port 47 through which the service reservoir will be charged when the check valve 13 is seated and in restricted recharging position, as will be hereinafter described. The service reservoir is in direct open communication with the application valve chamber 16, through passage 18 so that service reservoir pressure will be registered in said chamber and above the application valve 17 therein. A passage 20 leads from the service reservoir direct to a port 19 in the seat of the main slide valve. This port, in the emergency position of the main slide valve will be connected to a passage leading to the emergency reservoir. At all other times port 19 is closed by the main slide valve. A passage 21 connects the brake pipe passage 1 to a chamber 22 above a brake pipe vent valve 23. Brake pipe air flows to said chamber 22 and holds the valve 23 seated. A spring 82 yieldingly holds valve 23 to its seat. Below the valve 23 is formed a chamber 24 which is open to atmospheric port $A^1$ through a large passage 25. In the chamber 24 is slidably arranged a piston 27. This piston carries an upstanding tubular stem which loosely receives a depending stem carried by the valve 23, the tubular stem being suitably guided in the chamber 24. Below the piston 27 is formed a chamber 26 which is open to atmosphere through passage 28, cavity 29 of the main slide valve 30, port 31 in the main slide valve seat, and atmospheric port $A^2$. The cavity 29 is of such length that chamber 26 will be vented to atmosphere in all positions of the main slide valve except the emergency position, as will be hereinafter pointed out. From chamber 22 brake pipe air will flow through passage $32^b$ past check valve $32^a$ to the quick action reservoir $f$. The check valve seats toward the chamber 22. From the quick action reservoir a passage 32 leads to a port in the valve seat adjacent the port communicating with the passage 28 so that in emergency application the cavity 29 of the main valve will connect port 32 to the port and passage 28, as will be hereinafter described.

From passage 21 brake pipe air will flow from passage 33, port and passage 34 of the main slide valve, port and passage 35 to chamber 36. In chamber 36 is arranged a piston 37 which is provided with an upstanding tubular stem, said stem being suitably guided in the chamber 36. Surrounding said stem is a coil spring which tends to move the piston to the bottom of the chamber 36. The air flowing into chamber 36 through passage 35 will hold the piston against its seat at the bottom of the chamber 36. Chamber 36 is connected to an emergency reservoir $g$ by a suitable passage in which is arranged a check valve 42. Said valve seats toward the chamber 36 and is provided with a depending stem which slides in the tubular stem of the piston 37. Said valve is also provided with an upwardly extending guide stem. The brake pipe air flowing into chamber 36 lifts valve 42 from its seat and flows to the emergency reservoir. Below the piston 37 is a chamber 38 which is open to atmosphere through passage 39, cavity 40 of the main slide valve, port 41 and atmospheric port A³. The cavity 40 is of such length that port and passage 39 is connected to atmospheric port A³ in all positions of the main slide valve except emergency position. The emergency reservoir is in direct and open communication through passage 44 with an emergency reservoir chamber 43, the lower wall of which is formed by an emergency diaphragm 57.

When the pressures in the service reservoir, quick action reservoir and emergency reservoir have equalized with the brake pipe pressure, valves 12, 32ª and 42 return to their seats to prevent a back flow of air from said reservoirs to the brake pipe when a brake pipe reduction is made.

*Retarded re-charging and retarded release position (Fig. 2).*

When the brake pipe pressure in chamber 2 is rapidly increased, as for example on the forward portion of a train when the engineer's brake valve is placed in full release position, the main operating piston 5 will be forced to its extreme inner position to a fixed stop formed by the inner wall of the chamber 2. This extreme inward movement of the piston will cause the main slide valve to move the normal stop *a* inwardly against the tension of the spring 45. With the piston 5 in its extreme inner position the normal charging port 4 is blanked by the piston and a restricted charging port 46 is uncovered. Said port connects with a passage leading around the piston into chamber 6 so that said chamber will be charged from chamber 2 through the restricted charging port and passage 46. The high pressure brake pipe air will flow past check valve 12 and will force the check valve 13 to its seat against the resistance of spring 15 and the service reservoir will then be charged through the restricted charging port 47. When the check valve 13 is seated the normal charging port 14 will be closed. The quick action reservoir will be charged through passage 21 as previously described.

With the piston 5 and the valve 30 in retarded release and retarded re-charging position the emergency reservoir will not be charged. Ports 33 and 35 are closed by the main slide valve so that brake pipe air can not flow from passage 33 to the emergency reservoir charging port and passage 35. The emergency reservoir will not be charged until the piston 5 and the main slide valve have been returned by spring 45 to normal charging position.

When the pressure in chamber 6 becomes approximately equal to the brake pipe pressure in chamber 2 spring 45 will return valve 30 and the piston 5 to normal release and normal charging position, as shown in Fig. 1. The pressure in chamber 6 will then quickly and completely equalize with the brake pipe pressure in chamber 2 through the normal charging port 4. Port 34 will then connect passage 33 to emergency reservoir charging port and passage 35 and said resevoir will then be charged from the brake pipe as previously described. When the service reservoir pressure approximately equalizes with the brake pipe pressure spring 15 will force valve 13 from its seat, whereupon the service reservoir will completely equalize with the brake pipe pressure, as hereinbefore described.

*Running position. Fig. 3.*

When the system is fully charged and there is an equalization of pressures in chambers 9 and 43 the diaphragms 57 and 10 will be approximately balanced with a slight bias upward due to the fact that the emergency diaphragm 57 is slightly smaller than the actuating diaphragm 10, this slight bias holding valve 92 open. With no pressure in the control chamber and no pressure in the brake cylinder, the lap spring 67 will position the application valve to close the brake cylinder port 63 and the exhaust port and passage 78. With no pressure in the pressure governing chamber 53 exhaust valve 92 will be open. Valves 23 and 42 will be held seated by the air pressure in the chambers in which said valves are located.

*Service application position. Fig. 4.*

To obtain a service application of the brakes a service brake pipe reduction is made in the usual manner through the engineer's brake valve. This service reduction of brake pipe pressure is registered directly in the main brake pipe chamber 2. The pressure in chamber 6 forces the piston 5 toward the left, as viewed in the drawings, until it is stopped by the yielding spring pressed plunger which arrests the piston in service application position. The piston 5 carries with it the main slide valve 30 and the graduating valve 48. The movement of the graduating valve on the main slide valve opens port 49 through the main slide valve, and the movement of the main slide valve places the application port 49 in register with a port and passage 50. Passage 50 is connected by a passage 51 to a brake cylinder control chamber 52. Chamber 52 is in direct open communication through passages 51 and 55 with the pressure governing chamber 53. The upper wall of this chamber is formed by the pressure governing diaphragm 54. Port 49 through the main slide valve is so proportioned that the rate of pressure reduction in chamber 6 and in the pressure chamber 7 is equal to the rate of pressure reduction in chamber 2 when a service brake pipe reduction is made. This equal rate of pressure drop plus the resistance of the service spring 56 encountered by piston 5 in service position, causes the piston 5 and valve 30 to stop at and remain in service position. When the pressure in chambers 6 and 9 drops slightly below that in chamber 2 piston 5 will be moved inwardly or toward the right, as viewed in the drawing, by the superior pressure in chamber 2, and will carry with it the graduating valve 48 to service lap position. (See Fig. 5.) In this position the graduating valve closes port 49 thereby preventing further flow of air from chamber 6.

The combined volumes of chambers 52 and 53 is so proportioned to the volume of pressure chamber 7 and the valve chamber 6 as to give a desired ratio between the brake pipe reduction and the pressure in the control chamber 52 and in the pressure governing chamber 53. For example, the volumes of the various reservoirs and chambers may be so proportioned that a ten pound brake pipe pressure reduction will result in a build up of a twenty-five pound pressure in chambers 52 and 53 before the graduating valve is moved to lap position. It will, of course, be understood that the ratio of pressure developed in the chambers 52 and 53 may be varied to any desired extent.

The pressure build up in the pressure control chamber 52 forces the piston 62 to the right, as viewed in the drawings. The application valve 17 is connected to the piston stem of the piston 62 and moves with it to application position. The piston in application position is stopped by the inner wall of the control chamber. When the application valve is in application position port 63 is uncovered and service reservoir air will flow from chamber 16 through port and passage 63 to the brake cylinder $h$. The brake cylinder chamber 66 on the right hand side of the piston 62 is in direct communication with the brake cylinder passage 64 through passage 65 so that brake cylinder pressure will be exerted on the piston 62 in opposition to the pressure in the control chamber 52. When the piston 62 is moved to application position the lap spring 67 is compressed. When brake cylinder pressure equals the pressure in the control chamber 52 piston 62 and the application valve will be moved to lap position by the lap spring 67 and port 63 will be closed. The brake cylinder pressure balanced against the pressure in the control chamber 52 is the determining factor in lapping the application valve 17. Brake cylinder pressure will therefore be built up in the brake cylinder without regard to brake cylinder piston travel.

The emergency diaphragm 57 is slightly smaller in area than the actuating diaphragm 10. Between these two diaphragms is formed a chamber 58 that is open to atmosphere at all times through passage 60. The chamber 59 above the pressure governing diaphragm 54 is in open communication with the chamber 58 and with the atmosphere through passage 60. The diaphragms 57 and 10 are rigidly connected together by a central stem and the diaphragm 54 is connected to the diaphragms 57 and 10 by levers $i$ and $j$ and a link $k$, in such manner that the three diaphragms move together and move equal distances. The area of the diaphragm 54 is smaller than the diaphragms 57 and 10, and is so proportioned to the areas of the diaphragms 57 and 10 as to give the same pressure ratio as exists between the volumes of chambers 7 and 6 and chambers 52 and 53. For example, the build-up pressure in chamber 53 below the diaphragm 54 must be sufficient to assist the reduced pressure in chamber 9 to balance the undisturbed emergency reservoir pressure in chamber 43. If a pressure reduction of twenty pounds from seventy pounds in chamber 7 results in a pressure of fifty pounds in chambers 52 and 53, the diaphragms must be so proportioned that a pressure of fifty pounds in chamber 53 plus the reduced pressure in chamber 9, which will be fifty pounds, must balance the undisturbed emergency reservoir pressure of seventy pounds in chamber 43. It is therefore manifest that the ratio of pressure built up in chamber 53 to the reduction registered in chamber 9 due to the brake pipe reduction will be precisely the same ratio as the pressure built up in chamber 53 is to the brake pipe reduction in chamber 2.

If the pressure built up in chamber 53 from a given brake pipe reduction plus the upward force exerted on the diaphragm 10 by the reduced pressure in chamber 9 is less than the downward force exerted on the diaphragm 57 by the undisturbed emergency reservoir pressure in chamber 43 the diaphragms will move downwardly. This downward movement of the diaphragms, because of the link and lever connections, will compress the spring 61 and hold the valve 92 more firmly to its seat. If the sum of the upward forces on diaphragms 10 and 54 should be greater than the downward force on diaphragm 57 the diaphragms would move upwardly lifting the valve 92 from its seat and opening the exhaust port $l$ and thereby permit the escape of air from chamber 53 and from the control chamber 52. Air will continue to exhaust from said chamber until the pressure in chamber 53 is sufficiently reduced to permit the pressure in chamber 43 to move the diaphragms downwardly to again seat valve 92 and close the exhaust port $l$. This action of the diaphragm structure will ensure the exhaust of an over-charge of pressure from the control chamber 52 when such an over-charge results from an over-charge of pressure in chamber 7.

If the brake cylinder pressure be reduced by leakage the balance of pressures on piston 62 is destroyed and the undisturbed pressure in the control chamber 52 will move the piston 62 and the application valve 17 to application position thereby again uncovering port 63. Air will again flow from the service reservoir to the brake cylinder to supply the pressure lost by leakage.

*Normal release—Quick release.*

The triple valve is provided with a release governing valve mechanism. This mechanism consists of a manually operable rod $m$ carrying a limiting head or stop at its inner end. This rod is formed with two cavities one wall of which is inclined to form a cam. Two quick release valves 71 and 76 are provided, said valves being normally held seated by springs which surround the upper portions of their guide stems. These valves are provided with depending operating stems which when the valves are seated, rest in the cavities formed in the operating rod. By forcing the rod inwardly the cams on the rod force the valves upwardly to open position against the tension of their springs. The valve 76 is located in a small chamber which is connected by a passage 75 to a port in the main slide valve seat, said port opening into a cavity 74 in the main slide valve which cavity places port 75 in communication with a port and passage 73 leading directly to the control chamber passage 51. The valve 76 when seated closes a large atmospheric port $A^4$. When this valve is open and in quick release position the control chamber and the pressure governing chamber 53 are open to atmosphere through the connected ports and passages and the atmospheric port $A^4$.

The valve 71 is arranged in a small chamber which is connected by passage 70 to a port in the main slide valve seat. In the normal re-charging and release position of the main slide valve, port 70 registers with a cavity 69 in the main slide valve and said cavity places the port 70 in communication with the brake cylinder port 68. The valve 71 when seated closes a large atmospheric port $A^5$. It is therefore manifest that when the valve 71 is in quick release position the atmospheric port $A^5$ is open providing for a quick release of brake cylinder pressure through the passage 72, passage 68, cavity 69 and passage 70. When, however, the main slide valve is in retarded release and retarded re-charging position the cavity 69 is out of register with port and passage 70 thereby preventing the quick release of brake cylinder pressure past quick release valve 71.

The operating rod $m$ is drawn outwardly to permit the valves 71 and 76 to close for graduated release operations. For quick release operations the rod is forced inwardly thereby opening the valves 71 and 76.

For a quick release of the brakes after a service application, the release governing valve rod being in quick release position, the brake pipe pressure is increased a normal amount in the usual manner. The increase in pressure will be registered in chamber 2 and will prevail over the pressure in chamber 6 and force the piston 5 and valve 30 to normal release position. (See Fig. 1.) The brake cylinder pressure is vented to atmosphere through passages 64 and 71, port and passage 68, cavity 69 in the main slide valve, port and passage 70, past the open quick release valve 71 to the atmospheric port $A^5$. The control chamber 52 is also vented to atmosphere through passage 51, port and passage 73, cavity 74 in the main slide valve, port and passage 75, past the open quick release valve 76 to the atmospheric port $A^4$. Brake cylinder pressure in brake cylinder chamber 66 will force piston 62 and the application valve to release position, compressing the lap spring 67. In the release position of the application valve brake cylinder pressure will be vented to atmosphere through passage 64, port and passage 63 port and passage 77 in the application valve, passage 78, cavity 79 in the main slide valve and atmospheric port $A^6$. The reservoirs will be charged during this release operation as hereinbefore described.

*Retarded release—Quick release (Fig. 2).*

If the brake pipe pressure should be rapidly and abnormally increased during the release operations the rapid increase of pressure in chamber 2 would force the piston 5 and the valve 30 to retarded release and retarded recharging position, as hereinbefore described. This movement of the main slide valve will carry the cavity 69 out of register with the port and passage 70 and thereby prevent the free release of brake cylinder pressure past the quick release valve 71. The control chamber 52 and the pressure governing chamber 53 are vented to atmosphere in this retarded release position of the main slide valve precisely as hereinbefore described, that is to say past the quick release valve 76 to atmospheric port $A^4$. The brake cylinder pressure in chamber 66 will force the piston 62 and the application valve 17 to release position, against the tension of the lap spring 67. The brake cylinder pressure will therefore be vented to atmosphere through passage 64, port and passage 63, port 77 of the application valve, port and passage 78, cavity 79 of the main slide valve and atmospheric port $A^6$. This will result in a slow release of brake cylinder pressure as long as the main slide valve remains in retarded release position. When the main slide valve and the piston 5 move to normal release position, as hereinbefore described, the brake cylinder pressure will be quickly released past valve 71 and through atmospheric port $A^5$ as hereinbefore described.

Graduated release.

When operating the triple valve in graduated release the release governing valve rod $m$ is pulled outwardly and the valves 71 and 76 are closed. This prevents the release of brake cylinder pressure and control chamber pressure through the atmospheric ports $A^5$ and $A^4$.

To effect a release after a service application, when operating in graduated release, the brake pipe pressure is increased in the usual manner. If it is desired to effect a full release of brake cylinder pressure the brake pipe pressure is raised to normal running pressure. If a partial release of the brakes is desired the brake pipe pressure is only partially restored. Assuming that a full release of the brake cylinder pressure is desired and that the brake pipe pressure is slowly increased to normal, that is to say at the normal rate of increase, the piston 5 and the main slide valve will move to normal release and normal re-charging position. (See Fig. 1). Pressure from the control chamber 52 cannot be released past the check valve 76 because that valve is closed. Chamber 52 will be vented to atmosphere through the exhaust port $l$ controlled by the valve 92. The increasing pressure in chamber 9 will move the diaphragms upwardly and the valve 92 will be opened permitting a direct exhaust from chamber 52 to atmosphere. The pressure in the pressure governing chamber 53 will assist the increasing pressure in chamber 9 to move the diaphragm structure upwardly to open the valve 92. The brake cylinder pressure in the chamber 66 will force the piston 62 to release position. In the release position of the application valve brake cylinder pressure will be exhausted as previously described through atmospheric port $A^6$. The piston 62 and the application valve 17 will remain in release position until full normal running pressure has been established in chambers 6 and 9 and until all of the pressure has been exhausted from the control chamber 52 and all of the brake cylinder pressure has been exhausted from chamber 66 and the brake cylinder. When chamber 53 has been reduced to atmospheric pressure and the pressure in chamber 9 equalizes with the undisturbed emergency reservoir pressure in chamber 43 the diaphragm structure will move back to normal position and valve 92 will remain open. It will, of course, be understood that during this release operation the reservoirs will be re-charged as hereinbefore described.

A rapid and abnormal increase in the brake pipe pressure will correspondingly increase the pressure in chamber 2 and move the piston 5 and the valve 30 to retarded release and retarded re-charging position as hereinbefore described. There will be no exhaust through the main slide valve of pressure from the control chamber, as hereinbefore set forth. In the retarded release and the retarded-re-charging position of the main slide valve, the valve 92 will be opened precisely as described in connection with the normal release operation. The reduction of pressure in chamber 52 will result in the application valve going to release position and the release of brake cylinder pressure will take place through atmospheric port $A^6$ as previously described.

In the retarded release and retarded re-charging position of the main slide valve the release of brake cylinder pressure will be controlled wholly by the increase of pressure in chamber 6 through the restricted re-charging port 46. The increasing pressure in chamber 6 will be registered in the actuating chamber 9 under diaphragm 10 and will raise the diaphragm structure and open valve 92. This operation will permit pressure to exhaust from the control chamber 52 and pressure governing chamber 53 only as rapidly, and only to the extent, of the increase of pressure in chamber 9. The reduction of pressure in chamber 52 will control the release of brake cylinder pressure. It is therefore manifest that brake cylinder pressure will be slowly released through a triple valve in retarded release position. It is also clear that the release of brake cylinder pressure will be dependent upon the re-charging of chamber 6 and the pressure chamber 7. The result of this is that the brakes on the head end of the train will be slowly released, if the main slide valve is in retarded release position, while the brakes at the rear end of the train will be quickly released with the main slide valve in normal release position. This is very important because it is desirable to release the brake at the rear end of the train first. It is also desirable that the release of brake cylinder pressure shall be slowest through those triple valves at the head end of the train where the re-charging brake pipe pressure is greatest. It is manifest that the release of brake cylinder pressure, in the retarded re-charging position of the main slide valve will be controlled, or governed, by the increasing pressure in chamber 9. The release of brake cylinder pressure is dependent upon the release of pressure from chamber 52 and the increasing pressure in chamber 6 controls the release of pressure from 52 through the valve 92. If the brake cylinder pressure is released more rapidly through the atmospheric port $A^6$ than the pressure is released from chamber 52 through the valve 92, the pressure in the chamber 52 will move the application valve and close brake cylinder port 63, so that the release of brake cylinder pressure through the atmospheric port $A^6$ will be governed by the release of pressure from chamber 52 through valve 92.

To effect a partial release of the brake cylinder pressure the brake pipe pressure is increased the desired amount. The result of increasing brake pipe pressure will be to increase the pressure in chamber 6 through the charging port 4 and also to increase the pressure in the actuating chamber 9. This increase in pressure in chamber 9 will move the diaphragm structure upwardly thereby opening valve 92 to permit a reduction of pressure in the chamber 53 and likewise a reduction of pressure in the control chamber 52. When the pressure in chambers 53 and 52 is reduced an amount proportionate to the increased pressure in chamber 9, the downward force of the undisturbed emergency reservoir pressure on diaphragm 57 will prevail and will force the diaphragm downwardly and valve 92 will be closed. The spring 61 will yield and permit the diaphragm 54 to move downwardly and to hold the valve 92 firmly seated. Pressure in the control chamber 52 is thus reduced in direct proportion in rate and amount to the increase of pressure in chamber 9. The brake cylinder pressure in brake cylinder chamber 66 will force the piston 62 to the left and carry the application valve to release position. Brake cylinder pressure will then escape through the channel hereinbefore described to atmospheric port $A^6$, and will continue to flow to atmosphere until the pressure in chamber 66 has been reduced slightly below the pressure in chamber 52 whereupon the pressure in 52 will move the application valve to lap position, thereby retaining in the brake cylinder a pressure substantially equal to the pressure established in the control chamber 52. The emergency reservoir serves as a constant pressure reservoir in graduated release operations.

By increasing the brake pipe pressure in steps the brake cylinder pressure may be reduced in steps. It is therefore manifest that by increasing or decreasing the brake pipe pressure the brake cylinder pressure may be correspondingly and proportionately decreased or increased as desired. When the pressure in chamber 6 has been fully restored to the original running pressure, chambers 52 and 53 will be wholly exhausted and at the same time the brake cylinder will be reduced to atmospheric pressure.

*Emergency application (Fig. 6).*

For the emergency application of the brakes, an emergency reduction in brake pipe pressure is made in the usual manner. This rapid reduction in pressure is registered in chamber 2. The pressure in chamber 6 cannot be reduced at an equal rate through the port 49, with the result that the piston 5 connected to the main slide valve will be moved to its extreme position toward the left, compressing the spring 56 and seating against a sealing gasket arranged in chamber 2. The main slide valve will be moved to emergency position, in which position port and passage 32 will be connected by cavity 29 of the main slide valve to the port and passage 28 leading to the chamber 26 beneath the brake pipe vent valve piston 27. Air from the quick action reservoir $f$ will therefore flow to the chamber beneath the piston 27. Piston 27 will be forced upwardly lifting the vent valve 23 from its seat thereby opening passage 21 directly to atmosphere through atmospheric port $A^1$. Passage 21 is connected directly to brake pipe, as hereinbefore described, so that the brake pipe will be vented to atmosphere directly through said port $A^1$. A small leak port 81 through the piston 27 will permit the pressure from the quick action reservoir to exhaust to atmosphere through the atmospheric port $A^1$. When this pressure is exhausted the spring 82 will return the vent valve to its seat and will force the piston 27 downwardly.

When the main slide valve is in emergency position port 49 is out of register with port 50 so that air can not flow from chamber 6 to the control chamber 52 or to the pressure governing chamber 53. In the emergency position of the main slide valve and the graduating valve a port 83 in the graduating valve registers with a port 84 in the main slide valve, this latter port registering with a port and passage 39 which leads to the chamber 38 below the emergency reservoir valve piston 37. Said piston will therefore be raised and the emergency reservoir valve 42 unseated. Emergency reservoir air will flow past said valve into chamber 36 and then through passage 35, cavity 40 of the main slide valve into port and passage 85 and thence through passage 72 directly to the brake cylinder passage 64 and to the brake cylinder. A port and passage 86 of the main slide valve will register with port 19 in the main slide valve seat and connect said port to the cavity 40, and through said cavity to the brake cylinder port and passage 85. Service reservoir air will therefore flow through passage 20, port 19, port and passage 86 to the brake cylinder passage 85. A check valve 20ᵃ prevents a back flow of air to the service reservoir.

Emergency brake cylinder pressure in chamber 66 will force the piston 62 and application valve 17 to release position. This will not result in a loss of brake cylinder pressure because the brake cylinder exhaust port and passage 78 is closed in the emergency position of the main slide valve.

The release of the brake cylinder pressure after an emergency application takes place precisely as hereinbefore described. The pressure remaining in chamber 6 will be sealed therein and the main slide valve and the graduating valve will remain in emergency position until the brake pipe pressure is increased for a release of the brakes.

What we claim is:

1. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, and a pressure governing means subject to brake pipe, emergency reservoir and control chamber pressures and governing the pressure in the control chamber.

2. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, and pressure governing means subject to the pressure in the control chamber and the brake pipe and operating in response to an increase in brake pipe pressure to release air from the control chamber in direct proportion to the increase in brake pipe pressure.

3. In a fluid pressure brake the combination with a service reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, and a pressure governing means subject to the pressure in the control chamber and operating upon an increase in brake pipe pressure to exhaust air from said control chamber.

4. In a fluid pressure brake the combination with a service reservoir and a brake cylinder, of an application valve device governed by the opposing pressures of the brake cylinder and a control chamber for supplying fluid from the reservoir to the brake cylinder for a service application of the brakes, a main slide valve operated by a service reduction of brake pipe pressure to establish in the said control chamber a pressure equal to the desired cylinder pressure said established pressure moving the application valve to application position, the said main slide valve operating in response to an emergency reduction in brake pipe pressure to place an emergency reservoir in direct communication with the brake cylinder independently of the control chamber, and a pressure governing means subject to the pressure in the control chamber during service applications of the brakes and operating upon an increase in brake pipe pressure to exhaust air from said control chamber to thereby permit the brake cylinder pressure to move the application valve to release position.

5. In a fluid pressure brake the combination of a service reservoir, an emergency reservoir and a brake cylinder, of an application valve device governed by the opposing pressures of the brake cylinder and a control chamber for supplying fluid from the service reservoir to the brake cylinder for a service application of the brakes, a main slide valve operated by a service reduction of brake pipe pressure to establish in the said control chamber a pressure equal to the desired brake cylinder pressure said established pressure moving the application valve to application position, the said main slide valve operating in response to an emergency reduction in brake pipe pressure to place the emergency reservoir in direct communication with the brake cylinder independently of the control chamber, a pressure governing means subject to the pressure in the control chamber during service applications of the brakes and operating upon an increase in brake pipe pressure to exhaust air from said control chamber to thereby permit the brake cylinder pressure to move the application valve to release position, a brake pipe vent valve, a quick action reservoir, means whereby when the main slide valve is in emergency position air from the quick action reservoir will open the brake pipe vent valve, and means whereby the air from the quick action reservoir will leak down to atmosphere.

6. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder for a service application of the brakes, a main slide valve operated by a service reduction of brake pipe pressure to establish in the said control chamber a pressure equal to the desired cylinder pressure said established pressure moving the application valve to application position, the said main slide valve operating in response to an emergency reduction in brake pipe pressure to place an emergency reservoir in direct communication with the brake cylinder independently of the control chamber, a pressure governing means subject to the pressure in the control chamber during service applications of the brakes and operating upon an increase in brake pipe pressure to exhaust air from said control chamber to thereby permit the brake cylinder pressure to move the application valve to release position, an emergency reservoir valve, and means whereby when the main slide valve is in emergency position said emergency reservoir valve will be opened to permit air to flow from the reservoir to the brake cylinder.

7. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, a main slide valve operated by a reduction of brake pipe pressure to establish in the said control chamber a pressure equal to the desired brake cylinder pressure said established pressure moving the application valve to application position, a pressure governing means subject to brake pipe, emergency reservoir and control chamber pressures and governing the pressure in the control chamber, and a manually operable quick release valve which when open permits air to flow from the control chamber direct to atmosphere when the main slide valve is in release position.

8. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, a main slide valve operated by a reduction of brake pipe pressure to establish in the said control chamber a pressure equal to the desired brake cylinder pressure said established pressure moving the application valve to application position, a pressure governing means subject to brake pipe, emergency reservoir and control chamber pressures and governing the pressure in the control chamber, and a manually operable quick release valve which when open permits air to flow from the brake cylinder direct to atmosphere when the main slide valve is in normal release position.

9. In a fluid pressure brake the combination with a service reservoir, an emergency reservoir and a brake cylinder, of a main slide valve, a graduating valve, a piston operatively connected to said valves and subject to the opposing pressures of the brake pipe and a pressure chamber, an application valve governed by the opposing pressures of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, and a pressure governing means subject to brake pipe, emergency reservoir and control chamber pressures and governing the pressure in the control chamber, said pressure governing means operating in response to an increase in brake pipe pressure after a service application of the brakes to open the control chamber to atmosphere.

10. In a fluid pressure brake the combination with a service reservoir, an emergency reservoir and a brake cylinder, of a main slide valve, a graduating valve, a piston operatively connected to said valves and subject to the opposing pressures of the brake pipe and chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a pressure governing means subject to brake pipe, emergency reservoir and control chamber pressures and governing the pressure in the control chamber said pressure governing means operating in response to an increase in brake pipe pressure after a service application of the brakes to open the control chamber to atmosphere, and a manually operable quick release valve which when open permits air to flow from the brake cylinder direct to atmosphere when the main slide valve is in normal release position.

11. In a fluid pressure brake the combination with a service reservoir, an emergency reservoir and a brake cylinder, of a main slide valve, a graduating valve, a piston operatively connected to said valves and subject to the opposing pressures of the brake pipe and a pressure chamber, an application valve governed by the opposing pressures of the brake cylinder and a control chamber for supplying fluid from the service reservoir to the brake cylinder, the main slide valve operating upon a reduction of brake pipe pressure to connect the pressure chamber to a pressure chamber, an application valve governed by the opposing pressure of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a pressure governing means subject to brake pipe, emergency reservoir and control chamber pressures and governing the pressure in the control chamber said pressure governing means operating in response to an increase in brake pipe pressure after a service application of the brakes to open the control chamber to atmosphere, and a manually operable quick release valve which when open permits air to flow from the control chamber direct to atmosphere when the main slide valve is in release position.

12. In a fluid pressure brake the combination with a service reservoir, an emergency reservoir and a brake cylinder, of a main slide valve, a graduating valve, a piston operatively connected to the said valves and subject to the opposing pressures of the brake pipe and a pressure chamber, an application valve governed by the opposing pressure of the brake cylinder and a control chamber to establish in the said control chamber a pressure equal to the desired brake cylinder pressure, said established pressure moving the application valve to application position, the graduating valve moving to cut off said communication when the desired pressure is established in the control chamber, a pressure governing means subject to brake pipe, emergency reservoir and control chamber pressures and governing the pressure in the control chamber said pressure governing means operating in response to an increase in brake pipe pressure after a service application of the brakes to open the control chamber to atmosphere, and means whereby the main slide valve in emergency position will connect the emergency reservoir to the brake cylinder independently of the application valve.

13. In a fluid pressure brake the combination with a service reservoir an emergency reservoir and a brake cylinder, of a main slide valve, a graduating valve, a piston operatively connected to the said valves and subject to the opposing pressures of the brake pipe and a pressure chamber and having a normal release and normal re-charging position and a retarded release and retarded re-charging position, the main slide valve in retarded release and retarded re-charging position preventing the charging of the emergency reservoir, an application valve governed by the opposing pressures of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a pressure governing means subject to brake pipe, emergency reservoir and control chamber pressures and governing the pressure in the control chamber said pressure governing means operating in response to an increase in brake pipe pressure after a service application of the brakes to open the control chamber to atmosphere, a manually operable quick release valve which when open permits air to flow from the brake cylinder direct to atmosphere when the main slide valve is in normal release position, the main slide valve in retarded release position closing communication between the brake cylinder and the quick release valve, means whereby the application valve will be moved to release position by the brake cylinder pressure when the control chamber is open to atmosphere, and means whereby the main slide valve and the application valve in their release positions will exhaust brake cylinder pressure.

14. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, a pressure governing means subject to brake pipe, emergency reservoir and control chamber pressures and governing the pressure in the control chamber, and a manually operable means to control a direct exhaust of control chamber pressure through the main slide valve when said slide valve is in release position, the pressure governing means controlling the exhaust of pressure from the control chamber when said manually operable means is in position to interrupt the direct exhaust of said pressure from the control chamber.

15. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, pressure governing means subject to the pressure in the control chamber and the brake pipe and operating in response to an increase in brake pipe pressure to release air from the control chamber in direct proportion to the increase in brake pipe pressure, and a manually operable means controlling the direct exhaust of pressure from the control chamber independently of the pressure governing means when the main slide valve is in release position.

16. In a fluid pressure brake the combination with a reservoir and a brake cylinder, of an application valve device governed by the opposing pressures of the brake cylinder and a control chamber for supplying fluid from the reservoir to the brake cylinder, means operated by a reduction of brake pipe pressure to establish in the said control chamber a pressure equal to the desired brake cylinder pressure said established pressure moving the application valve to application position, pressure governing means subject to the pressures in the control chamber and in the brake pipe and operating in response to an increase in brake pipe pressure to release air from the control chamber in direct proportion to the increase in brake pipe pressure, means operated by an increase in brake pipe pressure to exhaust air from the control chamber independently of the pressure governing means, and manually operable means to control the said independent exhaust of air from the control chamber.

17. In a fluid pressure brake the combination with a service reservoir, an emergency reservoir and a brake cylinder, of a main slide valve, a piston operatively connected to said valve and subject to the opposing pressures of the brake pipe and a pressure chamber, an application valve governed by the opposing pressures of the brake cylinder and a control chamber for supplying fluid from the service reservoir to the brake cylinder, a pressure governing means subject to the pressures of the pressure chamber, the emergency reservoir and the control chamber and governing the pressure in the control chamber said pressure governing means operating in response to an increase of pressure in the pressure chamber after a service application of the brakes to open the control chamber to atmosphere.

18. A triple valve for air brake apparatus operating upon a reduction of brake pipe pressure to admit air to the brake cylinder for an application of the brakes and operating upon an increase in brake pipe pressure to release air from the brake cylinder to atmosphere, means whereby a sudden and excessive increase in brake pipe pressure will move the triple valve to retarded release and retarded re-charging position, a restricted re-charging port adapted to be opened in the said retarded re-charging position, and means whereby the release of brake cylinder pressure will be governed by the slow re-charging of the system through said restricted re-charging port.

19. In a triple valve for air brake apparatus operating upon a reduction of brake pipe pressure to admit air to the brake cylinder for an application of the brakes and operating upon an increase in brake pipe pressure to release air from the brake cylinder to atmosphere, means whereby a sudden and excessive increase in brake pipe pressure will move the triple valve to retarded release and retarded re-charging position, means whereby the system will be slowly re-charged in the said retarded release and retarded re-charging position of the triple valve, and means whereby the release of brake cylinder pressure will be governed by the slow re-charging of the system.

20. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, a main slide valve operated by a reduction of brake pipe pressure to establish in the said control chamber a pressure equal to the desired brake cylinder pressure said established pressure moving the application valve to application position, a pressure governing means controlling the pressure in the control chamber, and a manually operable quick release valve which when open permits air to flow from the control chamber direct to atmosphere when the main slide valve is in release position.

21. In a fluid pressure brake the combination with a service reservoir, a constant pressure reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, and a pressure governing means subject to brake pipe, constant pressure reservoir and control chamber pressures and governing the pressure in the control chamber.

22. In a fluid pressure brake the combination with a service reservoir, a constant pressure reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, and a pressure governing means governing the pressure in the control chamber and means whereby the said pressure governing means is subject to brake pipe, constant pressure reservoir and control chamber pressures upon a service reduction of brake pipe pressure.

23. In a fluid pressure brake the combination with a service reservoir, an emergency reservoir and a brake cylinder, of a main slide valve, a graduating valve, a piston operatively connected to the said valves and subject to the opposing pressures of the brake pipe and a pressure chamber, an application valve governed by the opposing pressure of the brake cylinder and a control chamber for supplying fluid from the service reservoir to the brake cylinder, the main slide valve operating upon a reduction of brake pipe pressure to connect the pressure chamber to the control chamber to establish in the said control chamber a pressure equal to the desired brake cylinder pressure, said established pressure moving the application valve to application position, the graduating valve moving to cut off said communication when the desired pressure is established in the control chamber, a pressure governing means governing the pressure in the control chamber and operating in response to an increase in brake pipe pressure after a service application of the brakes to open the control chamber to atmosphere, and a manually operable quick release valve which when open permits air to flow from the brake cylinder direct to atmosphere when the main slide valve is in normal release position.

24. In a fluid pressure brake the combination with a service reservoir, an emergency reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, a pressure governing means subjected to brake pipe, emergency reservoir and control chamber pressures and governing the pressure in the control chamber, and manually operable release valves which when open permit air to flow from the brake cylinder and the control chamber direct to atmosphere independently of the pressure governing means when the main slide valve is in normal release position.

25. In a fluid pressure brake the combination with a service reservoir, an emergency reservoir and a brake cylinder, of a main slide valve, a piston operatively connected to said valve and subject to the opposing pressures of the brake pipe and a pressure chamber, an application valve governed by the opposing pressures of the brake cylinder and a control chamber for supplying fluid from the service reservoir to the brake cylinder, a pressure governing means subject to the pressures of the pressure chamber, the emergency reservoir and the control chamber and governing the pressure in the control chamber said pressure governing means operating in response to an increase of pressure in the brake pipe and in the pressure chamber after a service application of the brakes to open the control chamber to atmosphere, means whereby a sudden and excessive increase in brake pipe pressure will move the main slide valve to retarded release and retarded recharging position, a restricted recharging port adapted to be opened in the said retarded recharging position, and means whereby the pressure governing means will slowly release control chamber pressure in response to the slow recharging of the pressure chamber through said restricted recharging port.

26. In a fluid pressure brake the combination with a service reservoir, a constant pressure reservoir and a brake cylinder, of an application valve device governed by the opposing pressures of the brake cylinder and a control chamber for supplying fluid from the service reservoir to the brake cylinder, means operated by a reduction of brake pipe pressure to establish in the said control chamber a pressure equal to the desired brake cylinder pressure said established pressure moving the application valve to application position, and a pressure governing means subject to the pressures of a constant pressure reservoir, a control chamber, and a pressure variable with and by variations in brake pipe pressure, said pressure governing means governing the pressure in the control chamber.

In testimony whereof we hereunto affix our signatures.

SPENCER G. NEAL.
WILLIAM ASTLE.
EDWARD P. WILSON.